United States Patent [19]
Neville

[11] 4,358,268
[45] Nov. 9, 1982

[54] FURNACE SYSTEM WITH REHEATED FLUE GAS RECIRCULATION

[76] Inventor: Warren H. Neville, 6411 Vinevale #E, Bell, Calif. 90201

[21] Appl. No.: 216,242

[22] Filed: Dec. 15, 1980

[51] Int. Cl.³ .............................................. F27D 17/00
[52] U.S. Cl. ..................................... 432/180; 110/304; 431/215; 432/182
[58] Field of Search ................ 110/304, 302; 432/180, 432/181, 182, 28; 431/215, 11

[56] References Cited

U.S. PATENT DOCUMENTS

| | | | |
|---|---|---|---|
| 1,790,172 | 1/1931 | Smith et al. | 432/182 |
| 1,798,611 | 3/1931 | Leventry | 432/182 |
| 1,943,957 | 1/1934 | Godard | 432/181 |
| 3,015,357 | 1/1962 | Bain et al. | 432/28 X |
| 3,527,445 | 9/1970 | Stewart, Jr. et al. | 432/28 X |
| 4,299,561 | 11/1981 | Stokes | 432/180 |

*Primary Examiner*—Edward G. Favors
*Attorney, Agent, or Firm*—Dominick Nardelli

[57] ABSTRACT

The furnace system has a heating chamber wherein a rich combustion mixture is fed. The mixture has been preheated within a regenerator and the flue gas is ducted to another regenerator which is also fed with secondary air to more completely oxidize the flue gas. Part of the hot flue gas leaving the second regenerator is tapped and recirculated to the heating chamber and the remaining flue gas being fully oxidized is vented to the atmosphere. When the first mentioned regenerator becomes too cold to preheat the combustion mixture, given valves are opened and closed so that the combustion mixture first is preheated within the second regenerator, then burned, and directed to the heating chamber and the incomplete combustion flue gases are now ducted to the first mentioned regenerator to be completely oxidized as described before, and, in turn, to heat this regenerator. Again, part of the hot flue gas is reconducted to the heating chamber and the other part is being completely oxidized and is vented to the atmosphere.

8 Claims, 2 Drawing Figures

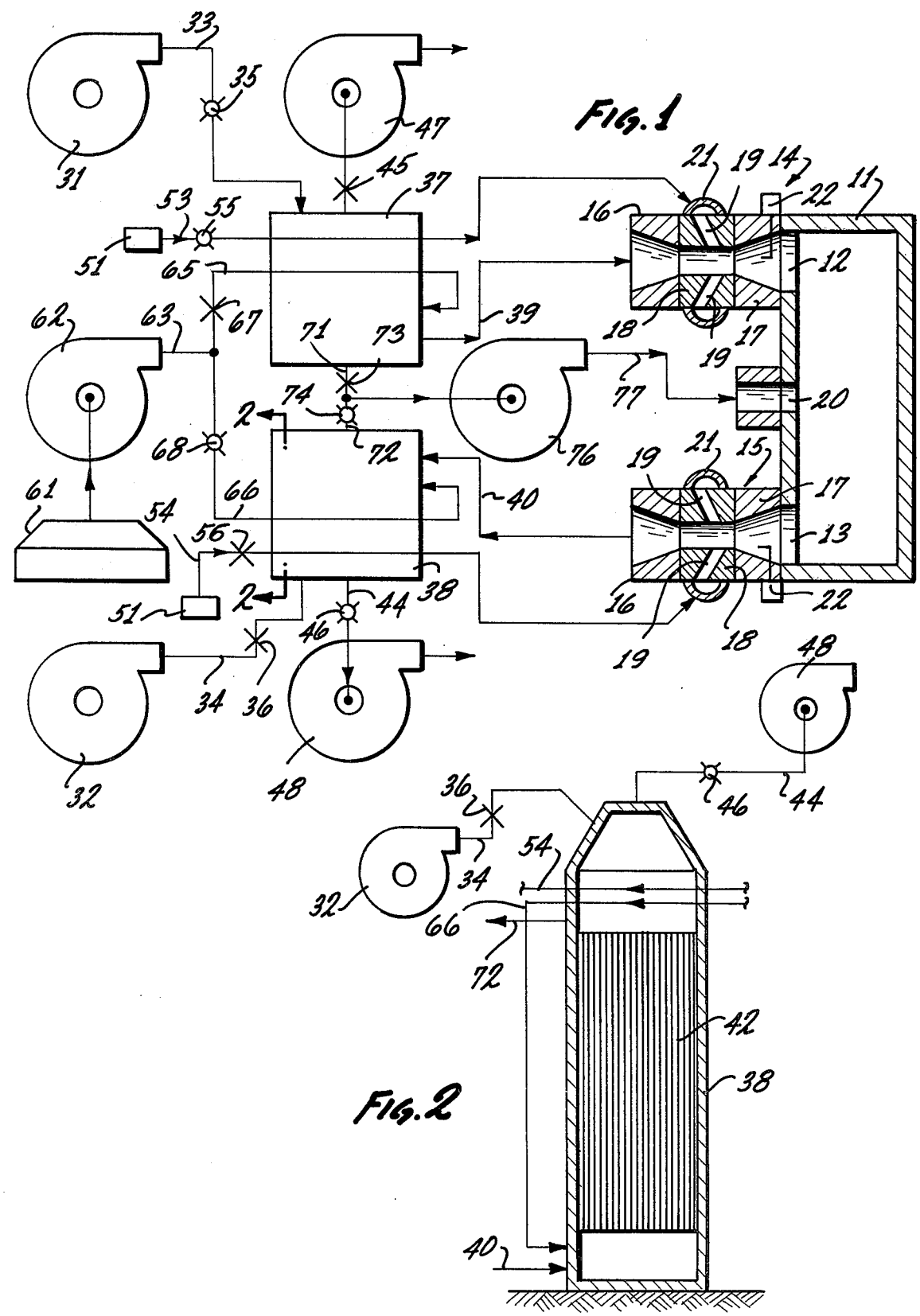

ed air and fuel for combustion, and, more particularly, to a furnace wherein a part of the flue gas is tapped and recirculated to the heating chamber to increase the mass flow rate therein, and wherein the NOX in the flue gas emissions are reduced.

FURNACE SYSTEM WITH REHEATED FLUE GAS RECIRCULATION

FIELD OF THE INVENTION

This invention relates to a furnace system using preheated air and fuel for combustion, and, more particularly, to a furnace wherein a part of the flue gas is tapped and recirculated to the heating chamber to increase the mass flow rate therein, and wherein the NOX in the flue gas emissions are reduced.

BACKGROUND OF THE INVENTION

In the past, furnaces using preheated combustion air had two regenerative means wherein the air is predetermined in one means, while the flue gases heat the other means. Then the flue gas was vented to the atmosphere. The mass flow rate of the hot gases in the furnace was limited by the end temperature of the combustion chamber. If a hotter chamber was required, one would obviously increase the air-fuel rate which in turn increased the mass flow rate within the chamber. Conversely, if one desired to increase the mass flow rate to increase heat transfer to the terms to be heated, one would also in these prior art systems would increase the temperature. An increase in temperature many times can not be tolerated by the products to be heated.

In addition, if one was heat-treating, or melting highly active metal, such as aluminum, special fluxes would be required in prior art systems to prevent oxidation of the metal. If one would use a fuel rich combustion mixture to prevent oxidation of the metal, energy would be wasted in these prior art systems.

OBJECTS OF THE INVENTION

An object of this invention is to provide a more economical and fuel efficient furnace.

Another object of this invention is to provide a furnace wherein the mass flow rate of the flue gas in the combustion chamber is capable of being increased without increasing the temperature.

Another object of this invention is to provide a furnace wherein the air fuel ratio can be analyzed before the gases reach the heating chamber, but after they are burned.

Another object of this invention is to provide a furnace which can efficiently burn multiple type fuels.

Another object of this invention is to provide a furnace which prevents flame impingement on the items to be heated.

Another object of this invention is to provide a furnace wherein part of the flue gas is recirculated back into the heating chamber.

Another object of this invention is to reduce the formation of Nitric Oxides (NOX) due to the ability of the system to operate with a deficiency of oxygen as primary combustion takes place.

Another object of this invention is to use the regenerators as an incinerator for any noxious fumes generated in the process and to recover their heat value.

Another object of this invention is to provide a furnace with two regenerators, one disposed before the combustion and heating chambers and the other disposed after the heating chamber with means for reversing the flow of combustion products flowing therethrough.

Another object of this invention is to provide means in the foregoing objects to further oxidize the flue gases within the down-stream regenerator.

These and other objects and features of advantages will become more apparent after one studies the following description of the preferred embodiment of my invention together with the appended drawing.

BRIEF DESCRIPTION OF THE DRAWING

FIG. 1 is a schematic representation of the flow diagram for the novel furnace system.

FIG. 2 is a cross-section elevation view of a typical regenerator taken on line 2—2 in the direction of the arrows.

DETAILED DESCRIPTION OF THE DRAWING

Referring to FIG. 1, the novel furnace has a heating chamber 11 shown schematically as a rectangular box having two openings 12 and 13. As will be described hereinafter, either opening, 12 or 13, may allow the hot gases to enter therein and either opening 12 or 13 may allow the flue gas to exit therefrom. To each opening is coupled a venturi-type tube 14 and 15 respectively, each forming a burning chamber. Each tube 14 and 15 has two interior-conical sections 16 and 17 with a removable interior-cylindrical section 18 disposed therebetween. The cylindrical section 18 has a plurality of substantially radially aligned apertures 19 and a manifold 21 disposed therearound and the manifold 21 communicates with the apertures 19. As will become apparent hereinafter, fuel is suitably coupled to first one and then the other manifold 21. Since cylindrical section 18 is made to be separated from the conical section 16 and 17, the size and direction of the apertures 19 can be changed to accomodate the fuel that is to be used to heat the furnace. Heating chamber 11 also has a third opening 20 in which, as will also be described hereinafter, hot recirculating flue gases are pumped into the heating chamber. Also in each conical section 17 there is provided a gas analyzer 22 wherein one can check the combustion ratio of the burning mixture in a standard manner to ensure, for example, that the atmosphere in the heating chamber is a reducing atmosphere, (lack of oxygen).

To understand my invention more fully the remaining components will be described along with the operation cycle. To start the furnace, one or the other of a pair of combustion air fans 31 and 32 are started, and for convenience, we will assume fan 31 has been started. The fan 31 has an outlet duct 33 with a suitable valve 35 therein, while fan 32 has an outlet duct 34 with a suitable valve 36 therein. For ease in understanding the invention, ducts 33 and 34 and valves 35 and 36 are schematically shown and, as will become apparent, other ducts and valves are also schematically shown. In addition, a closed valve is shown like valve 36 and an open valve is shown like valve 35. Duct 33 is coupled into the top of regenerator 37 whose function will be described later on. While fan 31 is on and valve 35 is open, atmospheric air is pumped through duct 33 into the regenerator 37 and out of the bottom of the regenerator through a duct 39 to be coupled to venturi tube 14. In the venturi tube the air is mixed in a standard manner with fuel that exits through apertures 19 and the mixture is burned in conical section 17. The hot flue gases pass through heating chamber 11 and exit by opening 13 and through venturi tube 15 where they are ducted by a duct 40 to another regenerator 38.

As shown in FIG. 2, duct 40 couples the flue gases into the bottom of the regenerator 38. While in the regenerator, the flue gas rises through a standard system of mass heat storage and transfer means 42 and the flue gases give up a substantial amount of its heat energy to the means 42. Then by a duct 44, which has an open valve 46 therein, the flue gases are preferably pumped by a fan 48 into the atmosphere.

When one observes that the means 42 has reached its maximum possible operating temperature, then, through a system of controls, valves 35 and 46 are closed and valves 36 and 45 are opened. If fan 32 was not energized, it is energized and now the atmospheric air passes from fan 32 through a duct 34 into the top of regenerator 38. The air flows down through the means 42 and is heated and the hot atmospheric air exits out of the bottom thereof through duct 40 to venturi tube 15 where it is mixed with fuel and burns substantially in the same manner as described for venturi tube 14. The flue gases from chamber 11 now exit through opening 12 and then through venturi 14 through duct 39 and regenerator 37 which is constructed similarly to regenerator 38. The mass heat storage and transfer means therein, which is the same as means 42 in regenerator 38, absorbs heat and becomes hot. When it has reached its highest maximum temperature, the flow is reversed. By this time regenerator 38 has substantially cooled.

Now the means for supplying fuel will be more fully described. Fuel is stored in suitable storage means 51. For simplicity, two storage means 51 are shown, although they can be the same. Out of the storage means 51, two conduits 53 and 54 are coupled which pass through regenerators 37 and 38 respectively. In conduit 53 a valve 55 is placed and is opened and closed in unison with valve 35 so that as atmospheric air in tube 53 is fed to the heating chamber, conduit 53 conducts fuel to venturi tube 14 and cuts off the fuel when valve 35 is closed. In conduit 54 a valve 56 is placed and is opened and closed in unison with valve 36 for obvious reasons as stated for valve 55.

As mentioned above, this novel furnace has substantial utility, when one is heating or melting relatively active metals, such as aluminum in heating chamber 11. One can produce a reducing atmosphere therein because, for one thing, the gas analyzers 21 are positioned in the conical sections 17 where the burning takes place. Then, through standard computer controls, one can increase or decrease the amount of fuel as required. Since a reducing atmosphere means that there is excess or unburned fuel in the flue gases, each regenerator has a means to introduce secondary air therein. To improve the efficiency, the secondary air may be sucked up through a suitable hood 61, schematically shown in FIG. 1, and the hood 61 would be normally over the heating chamber 11 to utilize the lost heat or noxious fumes. Although the hood 61 is shown removed from the heating chamber 11, one can imagine it placed over the chamber 11 so that the hot air above the chamber is utilized. As an alternative, this hood could be pliced over cooling ingots of metal if desired. The secondary air is sucked up by a standard fan 62 and pumped into a duct 63 which branches into ducts 65 and 66. In duct 65 is a valve 67 and in duct 66 is a valve 68. When valves 35, 55 and 46 are opened, valve 68 is opened, and valve 68 is closed, when valves 35, 55, and 46 are closed. Similarly, when valves 36, 56, and 45 are closed, valve 67 is closed and valve 67 is open, when valve 36, 56, and 45 are opened.

Therefore, when hot flue gases are passing through regenerator 38, duct 66 passes through the upper portion of the regenerator, as shown in FIG. 2, to further preheat the secondary air, which after being preheated, is ducted to the bottom of the regenerator and mixed with the hot flue gases to induce secondary burning and incineration to recover heat from any unburned hydrocarbons. Part of these hot flue gases are coupled from the upper portion of the regenerator 38 through a duct 72 and through open valve 74 to be pumped by another fan or eductor 76 into duct 77 which is coupled to opening 20 in chamber 11. Obviously, when the hot flue gases are passing through regenerator 37, a valve 73 is opened in duct 71 which, like duct 72 sucks flue gases out of the regenerator 37. Obviously, valve 72 is now closed. Ducts 71 and 72 lead to a common inlet duct 75 to fan 76. If one desires ducts 72 and 73 can be placed lower on the respective regenerators if one wants to draw off, for example, a reducing mixture.

Having described the preferred embodiment of my invention, one skilled in the art, after studying the above description of the preferred embodiment, can devise other embodiments without departing from the spirit of my invention. Therefore, my invention is not to be considered limited to the disclosed embodiment, but includes all embodiments falling within the scope of the appended claims.

I claim:
1. A furnace system comprising:
   a heating chamber having a first and second opening therein;
   a first and second burning chamber coupled to each of said first and second openings respectively;
   a first regenerator coupled to said first burning chamber and a second regenerator coupled to second burning chamber;
   each of said regenerators having a first, second and third opening and having a heat absorbing mass enclosed therein;
   said first and second openings on each of said regenerators being disposed on one side of said mass and said third opening being disposed on the opposite sides of said mass;
   first means for coupling fuel to each of said respective burning chambers;
   each of said first openings on each of said regenerators having combustion air coupled thereto;
   each of said third openings on each of said regenerators being coupled to a respective one of said burning chambers;
   second means for controlling said first means and said first, second and third openings on said respective first and second regenerators so that, as fuel is coupled to said first burning chamber, combustion air is coupled into said first opening and out of said third opening of said first regenerator to said first burning chamber and exhaust gas, leaving said second burning chamber, is coupled into said third opening and out of said second opening of said second regenerator into the atmosphere, and so that as fuel is coupled to said second burning chamber, combustion air is coupled into said first opening and out of said third opening of said second regenerator to said second burning chamber and exhaust gas, leaving said first burning chamber, is coupled into said third opening and out of said second opening of said first regenerator into the atmosphere;

each of said regenerators having a fourth opening disposed on the same side of said heat absorbing mass as said third opening;

third means for selectively supplying, one at a time, secondary combustion air to one of said fourth openings on said respective regenerator.

2. The system of claim 1 wherein said first means further comprises:

a fuel tank;

a first and second conduit, coupled to said fuel tank and to a respective one of said burning chambers;

said first conduit being disposed to pass through said first regenerator, and said second conduit being disposed to pass through said second regenerator.

3. The system of claim 1 wherein:

each of said regenerators has a fifth opening disposed between said second and third openings on each of said respective regenerators;

fourth means for selectively coupling hot flue gas from one of said fifth openings and coupling said flue gas to said heating chamber.

4. The system of claim 3 wherein:

each of said burning chambers comprises:

a first and a second conical section;

a cylindrical section disposed between said first and second conical sections to form a venturi;

said cylindrical section has at least one radially disposed hole;

said first means being disposed to couple fuel to each of said radially disposed holes.

5. The system of claim 1, wherein:

each of said burning chambers comprises:

a first and a second conical section;

a cylindrical section disposed between said first and second conical sections to form a venturi;

said cylindrical section has at least one radially disposed hole;

said first means being disposed to couple fuel to each of said radially disposed holes.

6. The system of claim 5 wherein said first means further comprises:

a fuel tank;

a first and second conduit, coupled to said fuel tank and to a respective one of said burning chambers;

said first conduit being disposed to pass through said first regenerator, and said second conduit being disposed to pass through said second regenerator.

7. The system of claim 3 wherein:

each of said regenerators has a fourth opening disposed on the same side of said heat absorbing mass as said third opening;

third means for selectively supplying, one at a time, secondary combustion air to one of said fourth openings on said respective regenerator.

8. The system of claim 7 wherein:

each of said regenerators has a fifth opening disposed between said second and third openings on each of said respective regenerators;

fourth means for selectively coupling hot flue gas from one of said fifth openings and coupling said flue gas to said heating chamber.

* * * * *